(12) United States Patent
Archambault et al.

(10) Patent No.: US 7,530,063 B2
(45) Date of Patent: May 5, 2009

(54) METHOD AND SYSTEM FOR CODE MODIFICATION BASED ON CACHE STRUCTURE

(75) Inventors: Roch Georges Archambault, North York (CA); Robert James Blainey, Newmarket (CA); Yaoqing Gao, North York (CA); John David McCalpin, Round Rock, TX (US); Francis Patrick O'Connell, Austin, TX (US); Pascal Vezolle, Villeneuve les Maguelone (FR); Steven Wayne White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/855,729

(22) Filed: May 27, 2004

(65) Prior Publication Data

US 2005/0138613 A1    Jun. 23, 2005

(30) Foreign Application Priority Data

Dec. 17, 2003    (CA) .................................... 2453685

(51) Int. Cl.
*G06F 9/45* (2006.01)

(52) U.S. Cl. ................... 717/160; 717/150; 717/151; 717/155; 717/158; 712/207; 712/241

(58) Field of Classification Search ................. 717/141, 717/150, 149, 151, 15, 155, 158–160; 712/207, 712/241
See application file for complete search history.

(56) References Cited

U.S. PATENT DOCUMENTS

| 5,704,053 A | 12/1997 | Santhanam |
| 5,797,013 A | 8/1998 | Mahadevan et al. |
| 5,854,934 A | 12/1998 | Hsu et al. |
| 5,950,007 A | 9/1999 | Nishiyama et al. |
| 5,953,531 A | 9/1999 | Megiddo et al. |
| 6,148,439 A | 11/2000 | Nishiyama |
| 6,265,790 B1 | 7/2001 | Vogman |
| 6,341,371 B1 * | 1/2002 | Tandri .................... 717/158 |
| 6,421,826 B1 | 7/2002 | Kosche et al. |
| 6,539,541 B1 | 3/2003 | Geva |
| 6,567,976 B1 | 5/2003 | Wolf |

(Continued)

OTHER PUBLICATIONS

Steven Muchnick, "Advanced Compiler Design and Implementations", 1997, Academic Press, pp. 559-562.*

(Continued)

*Primary Examiner*—Lewis A Bullock, Jr.
*Assistant Examiner*—Jue S Wang
(74) *Attorney, Agent, or Firm*—Richard H. Krukor; Kermit D. Lopez; Luis M. Ortiz

(57) ABSTRACT

A method and system of modifying instructions forming a loop is provided. A method of modifying instructions forming a loop includes modifying instructions forming a loop including: determining static and dynamic characteristics for the instructions; selecting a modification factor for the instructions based on a number of separate equivalent sections forming a cache in a processor which is processing the instructions; and modifying the instructions to interleave the instructions in the loop according to the modification factor and the static and dynamic characteristics when the instructions satisfy a modification criteria based on the static and dynamic characteristics.

30 Claims, 6 Drawing Sheets

U.S. PATENT DOCUMENTS

| | | | |
|---|---|---|---|
| 6,961,930 | B1* | 11/2005 | Waldspurger et al. ....... 717/141 |
| 2001/0020294 | A1* | 9/2001 | Ogawa et al. .................. 717/9 |
| 2002/0007484 | A1 | 1/2002 | Tirumalai et al. |
| 2002/0199178 | A1 | 12/2002 | Hobbs et al. |
| 2003/0005419 | A1 | 1/2003 | Pieper et al. |
| 2003/0084433 | A1* | 5/2003 | Luk et al. ................... 717/158 |
| 2003/0088864 | A1 | 5/2003 | Tirumalai et al. |
| 2003/0097652 | A1* | 5/2003 | Roediger et al. ............ 717/160 |

OTHER PUBLICATIONS

Barua et al., "Compiler Support for Scalable and Efficient Memory Systems", Nov. 2001, IEEE Transactions on Computers, vol. 50, No. 11, pp. 1234-1247.*

RC Agarwal et. al.; "Exploiting functional parallelism of POWER2 to design high-performance numerical algorithms"; IBM Journal of Research and Development, v38, n5, p. 563-76, Sep. 1994.

GE Allen et. al.; "Real-time high throughput sonar beamforming kernels using native signal processing and memory latency hiding techniques", Conference Record of the Thirty-Third Asilomar conference on Signals, Systems, and Computers, v1, p. 137-41, Oct. 1999.

LK John et. al.; "A comparative evaluation of software techniques to hide memory latency", Proceedings of the Twenty-Eighth Annual Hawaii International Conference on System Science, v1, p. 229-38, Jan. 1995.

RC Agarwal et al.; "Performance tuning on IBM RS/6000 Power 2 systems", Applied Parallel Computing, Third International Workshop, PARA '96 Proceedings, p. 1-13, Aug. 1996.

* cited by examiner

STORE STREAM PARTITIONING

LOAD STREAM PARTITIONING

METHOD AND SYSTEM FOR CODE MODIFICATION BASED ON CACHE STRUCTURE

FIELD OF THE INVENTION

The present invention is related to the field of program code modification based on data access to/from a cache memory.

BACKGROUND OF THE INVENTION

In order for a computer to execute a computer program, program code containing instructions is translated into machine readable code by a compiler. During execution of the computer program, information in the form of instructions and data from the program code may be stored in cache memory to retain this recently used information. According to the principle of spacial locality, sections of the program code that are close together are likely to be executed together. Related data is often stored together since it is likely that the data will be accessed from the cache together.

Compilers use various optimization techniques to minimize the time and computer resources used for execution of the machine readable code. One such technique involves the manner in which related data is partitioned based on the structure of the cache memory and the manner in which data is accessed to/from the cache.

SUMMARY OF THE INVENTION

In accordance with one aspect of the present invention there is provided a method of modifying instructions forming a loop including: determining static and dynamic characteristics for the instructions; selecting a modification factor for the instructions based on a number of separate equivalent sections forming a cache in a processor which is processing the instructions; and modifying the instructions to interleave the instructions in the loop according to the modification factor and the static and dynamic characteristics when the instructions satisfy a modification criteria based on the static and dynamic characteristics.

In accordance with another aspect of the present invention there is provided a system for modifying instructions forming a loop including: a characteristics determination mechanism that determines static and dynamic characteristics for the instructions; an analysis mechanism, in communication with the characteristics determination mechanism, that determines if the instructions satisfy modification criteria based on the static and dynamic characteristics; a classification mechanism that classifies the instructions into a load class and a store class, where a load class instruction obtains data from a cache in a processor which is processing the instructions and a store class instruction stores data in the cache; a factor determination mechanism that selects a modification factor for the instructions based on a number of separate equivalent sections forming the cache; and a modification mechanism, in communication with the factor determination mechanism and the analysis mechanism for receiving the instructions if the modification criteria is satisfied, comprising: a modification implementation mechanism that modifies the store class instructions to interleave the instructions in the loop according to the modification factor and the static and dynamic characteristics, if the instructions satisfy the modification criteria; and a partitioning mechanism that modifies the load class instructions according to a number of prefetch streams in the processor.

In accordance with a further aspect of the present invention there is provided a method of modifying instructions forming a loop including: determining static and dynamic characteristics for the instructions; classifying instructions into a load class and a store class, where a load class instruction obtains data from a cache in a processor which is processing the instructions and a store class instruction stores data in the cache; selecting a load modification factor for the instructions based on a number of prefetch streams in the processor; and modifying the load class instructions to obtain data identified in the load class instructions in multiple segments according to the load modification factor when the instructions satisfy the modification criteria.

In accordance with the present invention there is provided a computer-readable medium having computer-executable instructions for modifying instructions forming a loop, the computer-executable instructions including: determining static and dynamic characteristics for the instructions; selecting a load modification factor for the instructions based on a number of prefetch streams in the processor; and modifying the load class instructions to obtain data identified in the load class instructions in multiple segments according to the load modification factor when the instructions satisfy the modification criteria.

Other aspects and features of the present invention will become apparent to those ordinarily skilled in the art upon review of the following description of specific embodiments of the invention in conjunction with the accompanying figures.

DETAILED DESCRIPTION OF EMBODIMENTS OF THE PRESENT INVENTION

Figure 1:
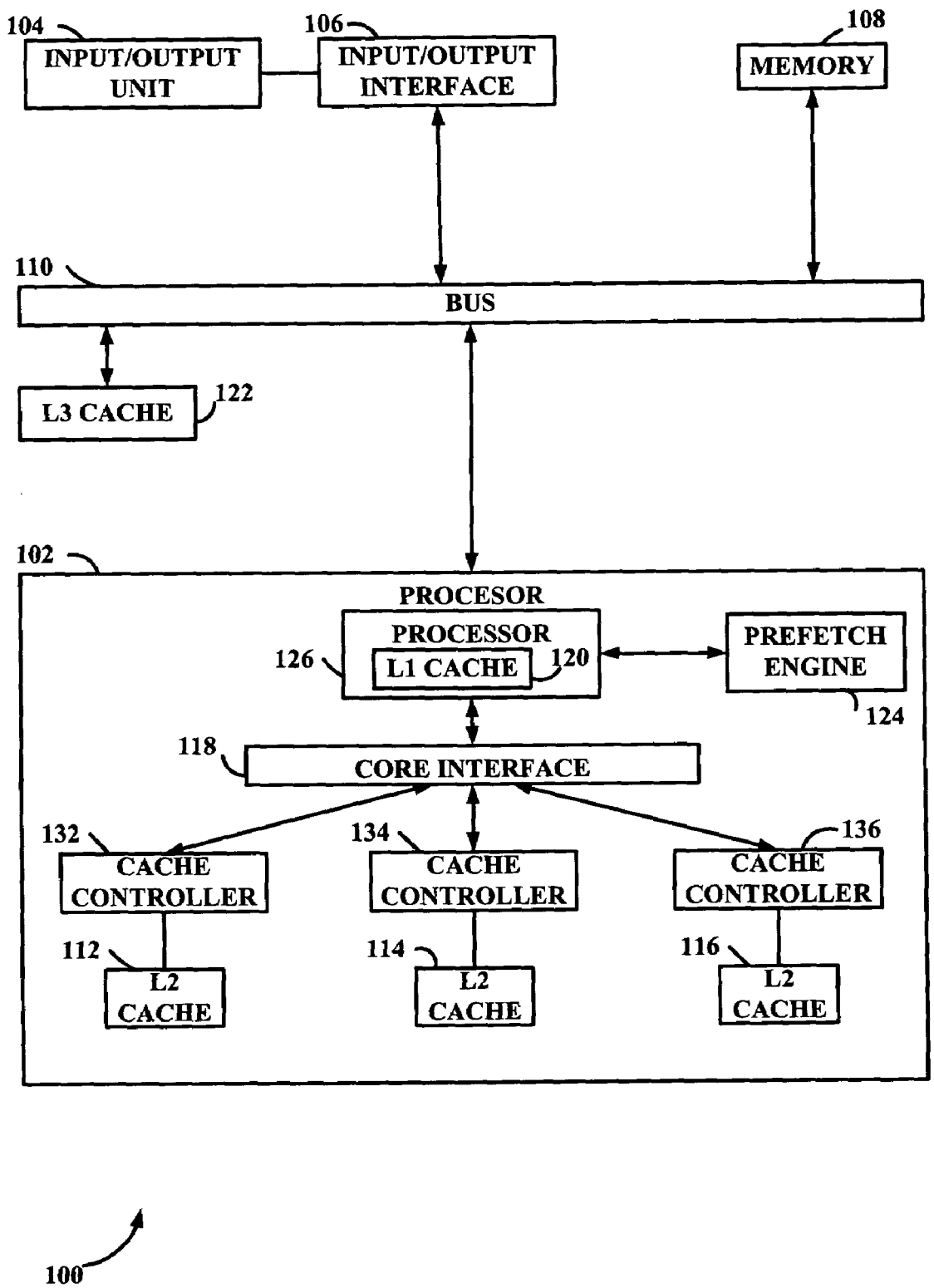
FIG. 1 represents an exemplary computing environment in which the present invention may be executed.

FIG. 1 shows an exemplary computing environment 100 in which the present invention may be implemented.

The computing environment 100 includes a processor 102, a memory 108, an input/output interface 106 and a bus 110. The processor 102, the memory 108 and the input/output interface 106 are connected with one another via the bus 110. The input/output interface 106 is configured so that it can be connected to an input/output unit 104.

Computer program code containing instructions for manipulating data may be stored in the memory 108. Alternatively, the program code may be recorded on any type of recording medium, such as a magnetic disk or an optical disk. The program code recorded on such a recording medium is loaded into the memory 108 of the computing environment 100 via the input/output interface 106.

The present invention may be embodied in a program stored in, for example, the memory 108. Alternatively, the present invention may be recorded on any type of recording medium such as a magnetic disk or an optical disk. The present invention recorded on such a recording medium is loaded to the memory 108 of the computing environment 100 via the input/output unit 104 (e.g. a disk drive).

The processor 102 can be a commercially available processor or a customized processor suitable for operations described herein. The processor 102 comprises a processor core 126 for performing the instructions in the program code, a core interface 118, multiple separate cache sections 112, 114, 116 that together form a second level cache (or L2 cache) of the cache of the processor 102, and a cache controller 132, 134, 136 for each of the cache sections 112, 114, 116. The processor 102 can accept multiple streams, where a stream is a series of related data. After the program code containing data and instructions is accessed from the memory 108, the processor core 126 stores the data and instructions. The processor core 126 contains a level one cache (or L1 cache) 120 in which the data and instructions may be initially stored. While FIG. 1 shows the processor core 126 being a single unit, the processor core 126 may be composed of multiple units working autonomously or in cooperation.

The information and data may be stored in subsequent levels of cache memory after the L1 cache 120 in the processor core 126. The separate cache sections 112, 114, 116 are second level cache. An L3 cache 122, or third level cache, may be provided in communication with the bus 110.

Information is moved in and out of the cache sections 112, 114, 116 in fixed amounts, or cache lines. To provide easy access to the information, there may be a single memory address used to refer to all information in a cache line.

The data and instructions may be split by the core interface 118 to be stored in the multiple cache sections 112, 114, 116. For example, the core interface 118 may store consecutive cache lines in different cache sections 112, 114, 116. The core interface 118 may map consecutively addressed cache lines in memory to different cache sections 112, 114, 116. The core interface 118 provides an overall control of the inflow and outflow between the processor core 126 and the multiple cache sections 112, 114, 116.

The cache controller 132, 134, 136 of each cache section 112, 114, 116 may function autonomously from each other allowing each of the cache sections 112, 114, 116 to function separately and concurrently. The cache controllers 132, 134, 136 coordinate inserting newly arrived information into the cache sections 112, 114, 116. Each cache controller 132, 134, 136 retains a map of the location in the cache section 112, 114, 116 in which data or instructions are stored.

Fetching data is effected by each of the cache controllers 132, 134, 136, according to the map therein, accessing the portion of the cache section 112, 114, 116 in which the data is contained. The processor 102 may also be provided with a prefetch engine 124 to fetch contents of cache lines of the cache sections 112, 114, 116 before such contents are requested. The prefetch engine 124 can only simultaneously prefetch a fixed number of streams. Once accessed, the data is provided to the processor core 126 from which it was requested.

Figure 2A:
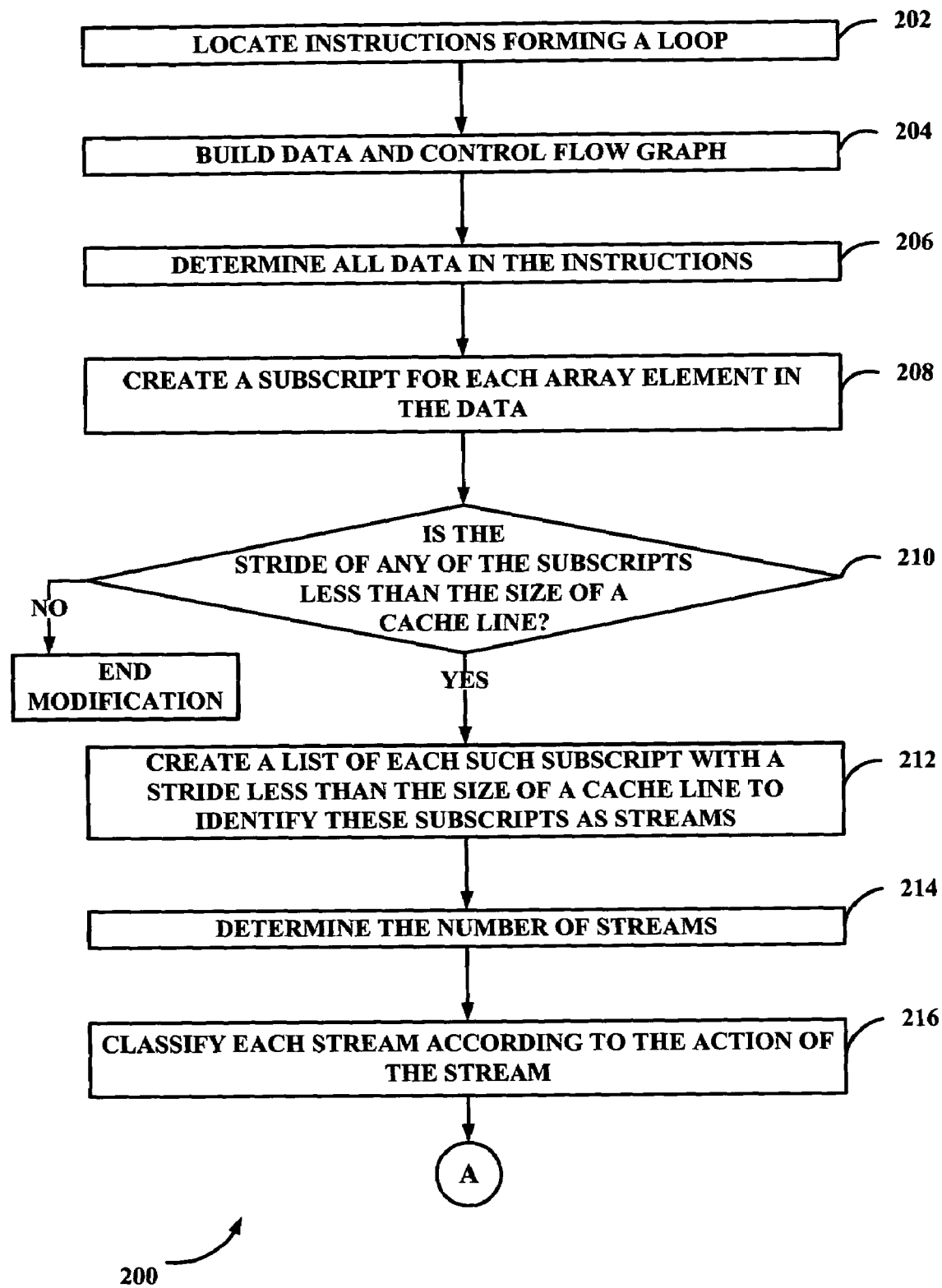
FIG. 2 is a flow diagram illustrating a method of cache storage based modifying of program code.
Figure 2B:
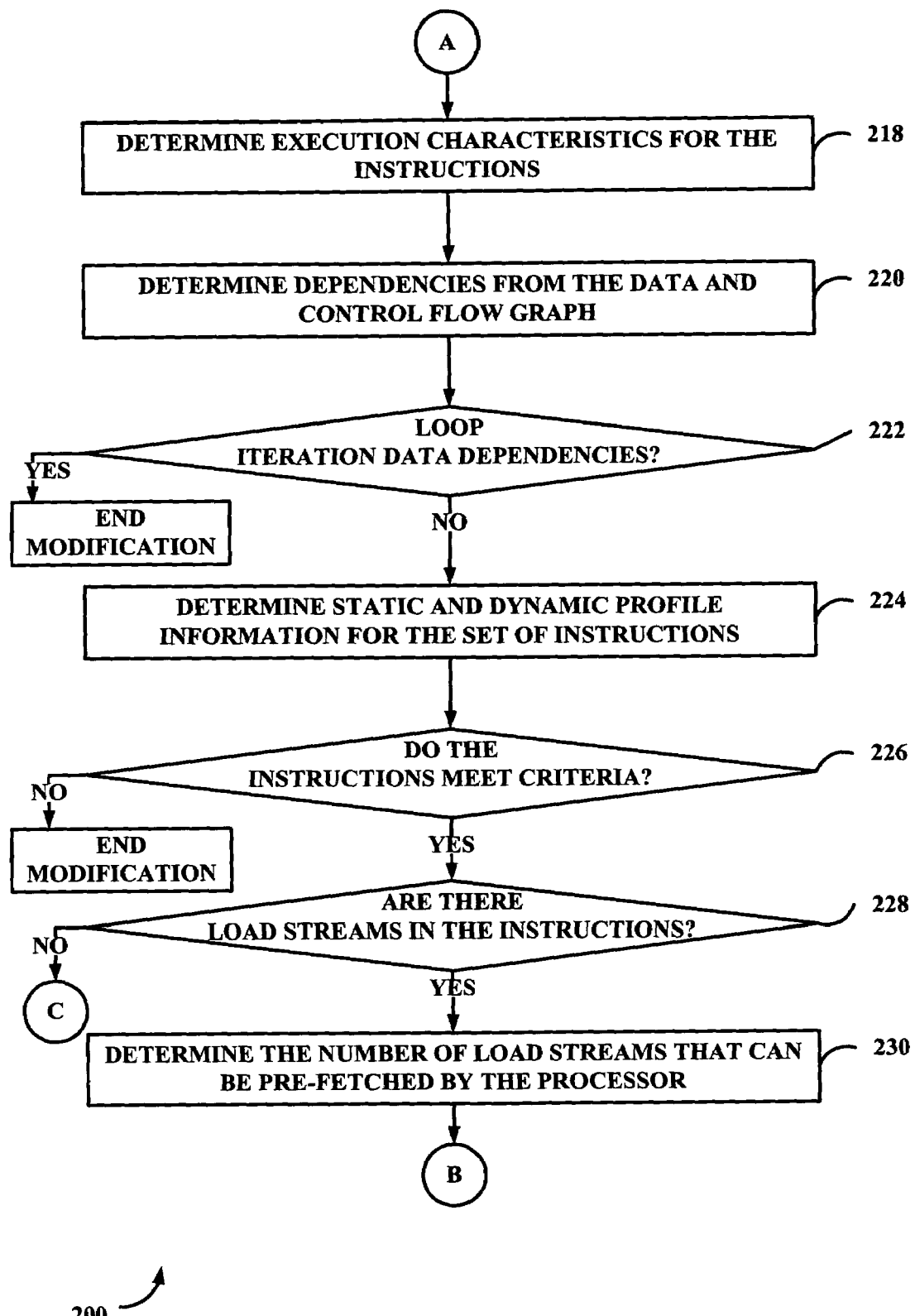
Figure 2C:
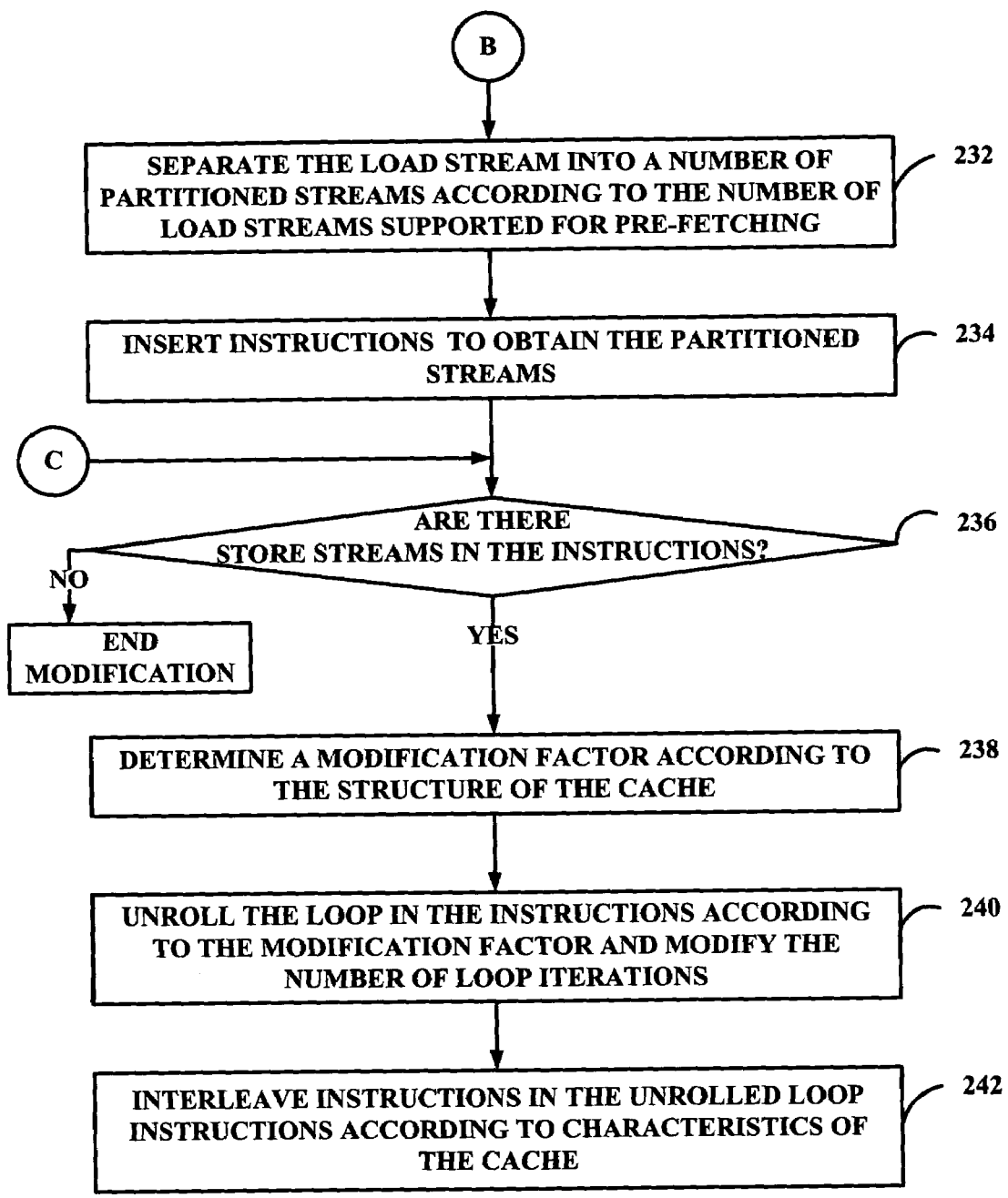

FIG. 2 shows a method 200 for cache storage based modification of the program code. The information (instructions and data) is stored in the cache in such a way as to exploit the parallelism of the multiple cache sections 112, 114, 116. The compiler performs various optimizations on the program code to minimize computer resources used and time taken for execution of the program. For example, a loop of instructions in the program code may be unrolled by performing multiple iterations of instructions without the loop or with fewer iterations of the loop. The loop may be completely removed by replacing the instructions from the loop directly with the instructions performed in all iterations of the loop. Alternatively, the loop may be replaced by multiple iterations of the instructions in a loop having a reduced iteration count. The method 200 may be used during such an optimization of loops in the program code. Instructions forming a loop in the program code is located in step 202.

During execution of the program code, the sequence in which instructions are executed at any given time is determined by data input into the program, data generated by the program and also by the task performed by each instruction. Data is used and is manipulated by these instructions during execution. A data and control flow graph of the instructions forming the loop is built in step 204 to represent the flow and manipulation of data between instructions and the sequence of execution of the instructions. The data flow graph can provide information on the dependencies of data between instructions that can determine the flow of control between instructions. For example, if a particular instruction uses the data resulting from a second instruction then the second instruction should be executed before the particular instruction.

The instructions are searched to determine the data used and manipulated thereby in step 206 to form a list of data for the instructions. For example, the instructions may be searched to determine the instructions and associated data that are involved in load or store operations. A load operation involves obtaining data from the cache sections 112, 114, 116. A store operation involves storing data in the cache sections 112, 114, 116.

If the data determined in step 206 is in the form of an array then there are multiple elements of data in the array, each having a location in the array that can be represented by a subscript. A subscript is created in step 208 for a reference of an element in each array. In other words, a subscript is created for each element in each array that is specifically indicated or used in one of the instructions.

Related data that can be grouped together for movement in and out of cache memory is considered to form a stream. A stream may be formed by data from multiple contiguous elements of the same array but generally not from different arrays. The stride of each of the subscripts created in step 208 is examined in step 210 to compare the subscript's stride with the size of the cache line. The stride of a subscript is the difference in locations in memory in which two subscripted elements of an array are stored. Those subscripts having a stride less than or equal to the size of a cache line are considered to form a stream. A list of those subscripts that are streams is created in step 212.

Although the streams determined in step 212 are based on the stride of subscripts, the streams may be related. That is, there may be streams in the list that are the same stream. Two streams are considered to refer to the same stream when the two streams have a reference to data that is the same or within the same cache line.

The total number of streams in the storage instructions is identified in step 212. One possible method by which the uniqueness of streams may be established is by determining a byte difference between every possible pair of streams determined in step 212. The values of a reference to data from two streams in the list are subtracted to determine a difference. Each reference to data in the streams have a known size. If the difference between the two reference to data is within the same cache line then the two streams are the same stream, otherwise, they are considered to be unique.

Each unique stream is examined in step 216 to determine its classification according to the action of the stream. For example, those streams that include at least one load instruction are classified as load streams whereas streams that include no load instructions are considered to be store streams.

Various characteristics that provide an indication of the execution characteristics for the instructions are determined in step 218. These characteristics may include an indication of the computer resources used by the instructions during execution. For example, the number of registers used by the instructions during execution may be considered since the number of registers used should not exceed the number of available registers in the processor 102. Also, the number of cycles that are used for the execution of one iteration of the loop and all iterations of the loop may also be considered. The number of execution cycles can depend on the number of iterations as well as the complexity of each instruction in the instructions.

After the various characteristics for the instructions are determined, a data dependency analysis is performed in step 220. The data dependency analysis examines the data dependencies between different iterations of the loop in the instructions. Such dependencies are taken into consideration when the instructions are optimized. The data dependency analysis considers whether instructions can be reordered based on constraints due to data dependencies.

If there are iteration data dependencies as determined in step 222 then modification of the instructions is not performed. If there are no prohibitive iteration data dependencies then a static and dynamic profile for the instructions is determined in step 224. The static profile for the instructions is based on characteristics thereof that can be determined without execution, such as the number of instructions and the number of iterations of the loop. The dynamic profile on the other hand is based on characteristics of the instructions that are determined during execution, such as execution time, etc. The dynamic profile can be determined by executing the instructions with sample data.

A series of conditions for cache storage based modification of a loop is determined and used as a basis against which the characteristics of the instructions can be compared to determine if such a modification will have a positive effect on the speed (execution and cache storage) and/or resources used during execution. For example, it may be determined that the instructions that will benefit from cache storage based modifications are those that take up a large portion of the execution time and number of machine cycles during execution of the entire program code, have a large number of iterations and have fewer streams than the number that can be prefetched by the processor 102.

Based on the static and dynamic profile information, the instructions are assessed to determine in step 226 if certain conditions governing the modifying process are met. The execution time and number of cycles used for the execution of the instructions is compared to the execution time and number of cycles used for the execution of the entire program code to produce an indication of the load that the instructions place during the execution of the entire program code. The number of streams in the instructions is compared with the number of streams that can be prefetched by the processor 102.

If the instructions do meet the criteria in step 226 then it is determined if the stream is a load stream in step 228. If there are load streams in the instructions as determined in step 228 according to the stream classification from step 216, then the number of load streams that can be prefetched by the processor 102 is determined in step 230. Each load stream in the instructions is separated into a number of partitioned streams in step 232. The number of partitioned streams from each stream in the instructions may be based on or the same as the number of streams supported for prefetching by the processor 102. Instructions are inserted into the instructions to obtain the load stream by obtaining the partitioned streams in step 234. If the instructions do not meet the conditions, as determined in step 226, then cache storage based modifications are not implemented.

If the instructions are for a store stream as determined in step 236 then a factor by which the loop in the instructions will be unrolled is determined in step 238. This modification factor is chosen such that constraints from the same conditions that were used in determining whether the instructions could be optimized are maintained and characteristics of the cache (comprising the cache sections 112, 114, 116) are exploited. That is, the loop unrolling factor is chosen such that the loop in the instructions is unrolled by as much as possible according to the characteristics of the cache. The factor may also be chosen based on the number of cache sections 112, 114, 116 such that with each iteration of the loop one store operation is performed on each cache section 112, 114, 116.

The factor determined in step 238 is then used to modify the instructions accordingly in step 240. In this manner multiple stores can be made simultaneously to each of the cache sections 112, 114, 116. The instructions may also be modified in step 242 to interleave the store operations such that the adjacent stores in each iteration are to consecutive cache lines, which are mapped into the three different cache sections 122, 114, 116. That is, the instructions would store contiguous data in each of the cache sections 112, 114, 116 in each loop iteration with the result being that continuous data would be stored in the same cache line.

Figure 3:
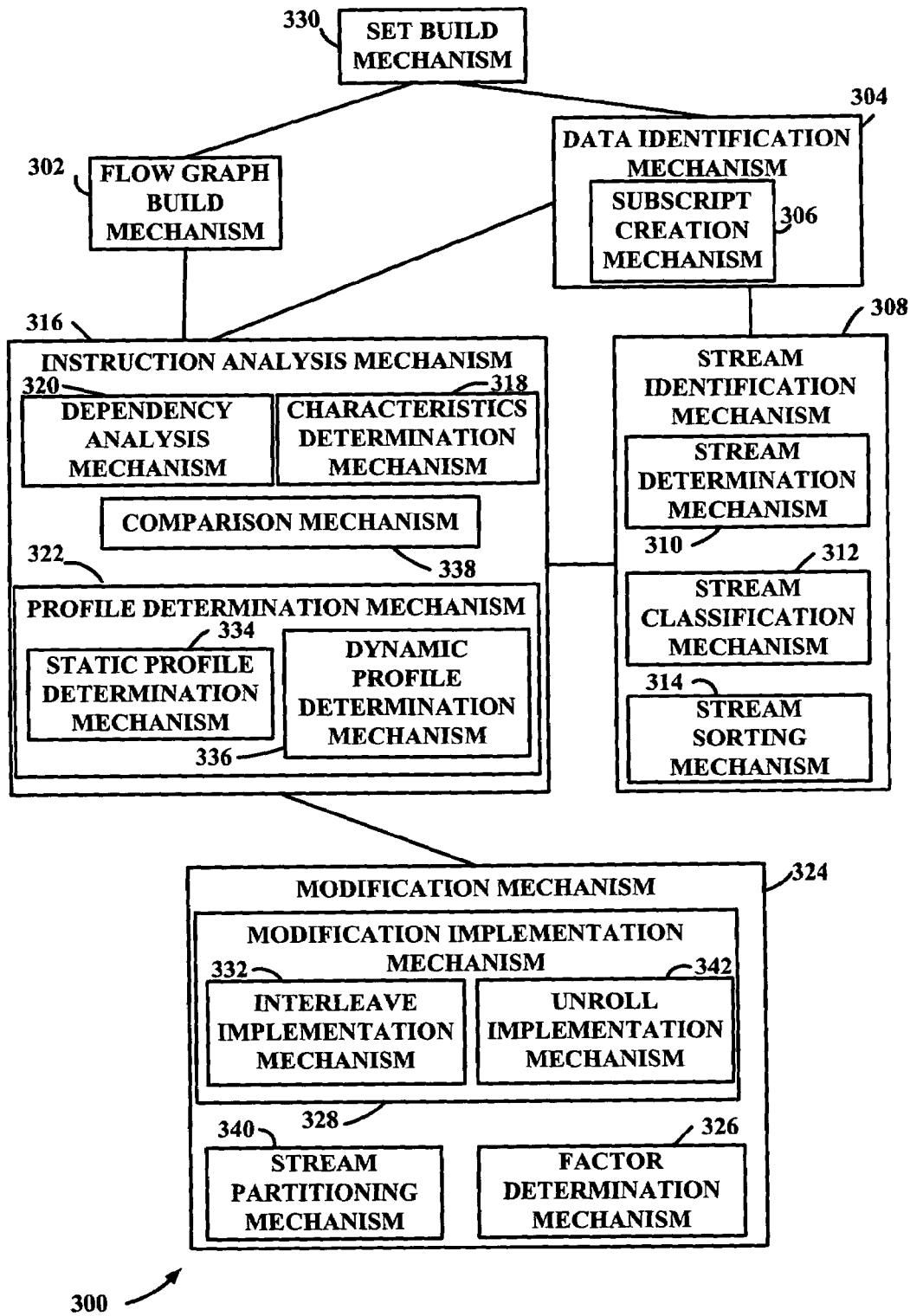
FIG. 3 is a system diagram illustrating a system for cache storage based modifying of program code.

FIG. 3 is a system diagram illustrating a system 300 for cache storage based modifications of the program code. The system 300 comprises a flow graph build mechanism 302, a data identification mechanism 304, a steam identification mechanism 308, an instruction analysis mechanism 316, an optimization mechanism 324, and a set build mechanism 330.

The set build mechanism 330 receives program code and identifies instructions within the program code that form loops. The instructions that form loops are provided to the flow graph build mechanism 302 where a flow and control graph of each loop is built.

After the data and control flow graphs have been completed, the data identification mechanism 304 searches through the instructions for each loop to locate all pieces of data used by and manipulated in the instructions. The data identification mechanism 304 comprises a subscript creation mechanism 306 that creates a subscript for each element in each array that is referenced as found by the data identification mechanism 304.

The subscripts are provided to the stream identification mechanism 308 where they are assessed to determine if they meet the characteristics of a stream. The stream identification mechanism 308 comprises a stream determination mechanism 310, a stream sorting mechanism 314 and a stream classification mechanism 312. The stream determination mechanism 310 examines the stride of each subscript to determine if the subscript stride is less than the size of a cache line for the cache sections 112, 114, 116 in the processor 102 of the computer system 100 in which the system 300 is implemented. Those subscripts that meet the characteristics of a stream (i.e. stride less than the size of a cache line) are identified as forming a stream. The stream sorting mechanism 314 assesses all of the identified streams to determine which streams are unique. The stream classification mechanism 312 classifies each stream according to the action of the stream (e.g. store, load, etc.).

After the streams have been determined and identified as unique, the instruction analysis mechanism 316 analyzes characteristics of the instructions to determine if modifications will be performed. The instruction analysis mechanism 316 comprises an execution characteristics determination mechanism 318, a data dependency analysis mechanism 320, a profile determination mechanism 322 and a comparison mechanism 338. The execution characteristics determination mechanism 318 determines various execution characteristics of the instructions such as the computer resources used during execution. The data dependency analysis mechanism 320 analyzes the data dependencies in the instructions on the basis of the data and control flow graph to determine if there is data whose value is iteration dependent. The profile determination mechanism 322 comprises a static profile determination mechanism 334 and a dynamic profile determination mechanism 336 for determining the static and dynamic profile information for the instructions, respectively. Based on the characteristics and the static and dynamic profile information for the instructions, the comparison mechanism 338 determines whether the instructions can be modified by comparing this information with a set of pre-developed conditions or criteria. These conditions represent those instructions that will likely benefit from cache storage based modifications.

The stream identification mechanism 308, the data dependency analysis mechanism 320, the execution characteristics determination mechanism 318 and the profile determination mechanism 322 may be grouped together as a characteristics determination mechanism.

Those instructions that meet the conditions for modification are provided to the modification mechanism 324. The modification mechanism 324 comprises a factor determination mechanism 326, a modification implementation mechanism 328, and a stream partitioning mechanism 340.

The factor determination mechanism 326 determines a factor by which the loop in the instructions will be unrolled. The factor is chosen to satisfy the conditions used by the instruction analysis mechanism 316 and also based on the number of cache sections 112, 114, 116 such that when the loop is unrolled it still satisfies the conditions and each iteration of the loop causes one store operation to be performed for each cache section 112, 114, 116.

The modification implementation mechanism 328 comprises an unroll implementation mechanism 342 and an interleave implementation mechanism 332. The unroll implementation mechanism 342 uses the factor determined by the factor determination mechanism 326 to modify the instructions accordingly. That is, the unroll implementation mechanism 328 unrolls the loop in the instructions according to the modification factor. The interleave implementation mechanism 332 interleaves store instructions to perform a store in a cache line in each cache section 112, 114, 116. After the data has been stored consecutive data is stored in the same cache section 112, 114, 116. In this manner, during execution of the instructions multiple stores can be made to each of the cache sections 112, 114, 116 during the same iteration of the loop.

The stream partitioning mechanism 340 modifies load streams such that each load stream is partitioned into multiple streams according to the number of streams that can be prefetched by the processor 102 such that each partitioned stream can be loaded simultaneously.

The following is an example of modifying code based on the structure of a cache memory and the manner in which data is accessed to/from the cache.

Instructions forming a loop contains the following:

```
double a[n];
for (i=0; i<n; i++) {a[i]=c0};
```

The instructions contain an array a that forms a stream. Since the instructions in the instructions are storing values for a, the instructions have a store stream.

In this example there are three cache sections and the cache line size for each section is 16 data elements (the cache line size is 128 bytes with each data element being 8 bytes). Therefore, the loop is unrolled three times (the number of sections) and the instructions in the unrolled loop are interleaved by 16 data elements (or one cache line). Since consecutive store instructions are stored in different cache sections, each store instruction will be to a different cache section but the interleaving places consecutive data elements in the same cache section since consecutive data is not consecutively stored. When the instructions are modified to implement these changes then the following will be the result:

```
double a[n];
for (i=0; i<(n/48)*48; i=i+48) {
    for (j=i; j<i+15; j++) {
        a[i]=c0;
        a[i+16]=c0;
        a[i+32]=c0; }}
for (i=(n/48)*48;i<n;i++) {a[i]=c0;}
```

Another example, in which the instructions includes both 'load' and 'store' streams is as follows:

```
double a[n], b[n], s;
for (i=0; i<n; i++) {s=S+a[i]+b[i]; }
```

The store stream in this example is the setting of s.

The arrays a, b and c in the instructions are used to set the value of s and as such are considered load streams as the values in a, b and c are loaded from the cache. The values for a, b and c may be fetched in multiple sections by cache lines according to the number of streams that can be prefetched by the processor. In this example, 8 streams can be loaded by the processor. When the instructions are modified to implement these changes then the following will be the result:

```
double a[n], b[n], c[n], s;
m=n/4;
for (i=0; i<m; i++) {
    s=s+a[i]+b[i];
    s=s+a[i+m]+b[i+m]
    s=s+a[i+2*m]+b[i+2*m];
    s=S+a[i+3*m]+b[i+3*m];}
```

Since there are two variables to be obtained, a, and b, the loop is unrolled by 4 so that 8 streams of data are fetched.

Figure 4:
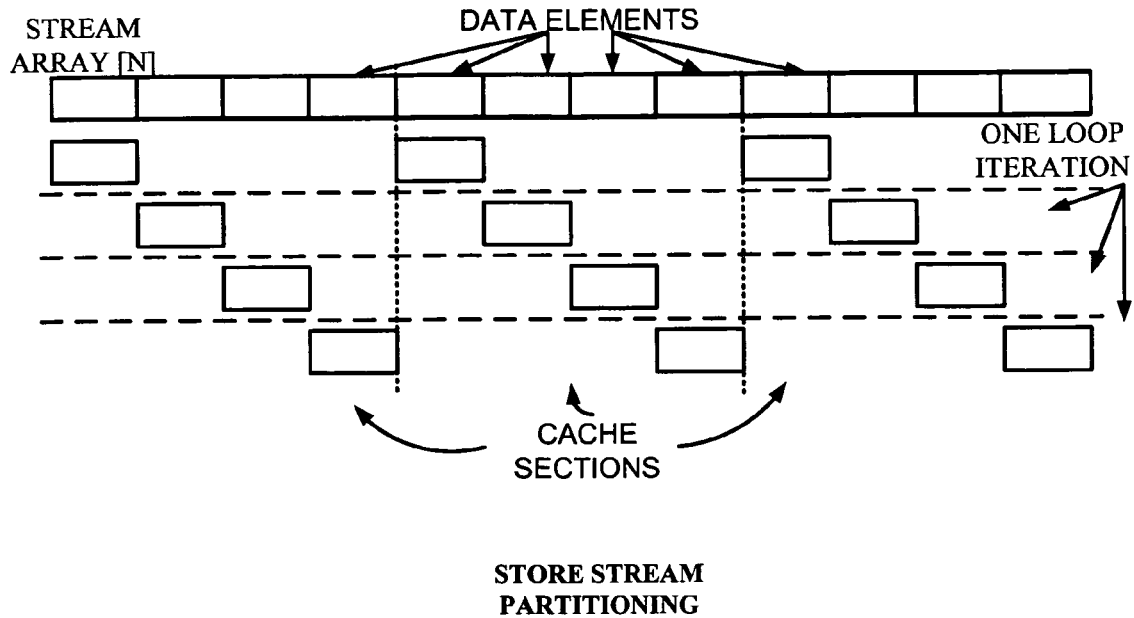
FIG. 4 is an example of data streams partitioned for storage in the cache in accordance with FIG. 2.
Figure 4:
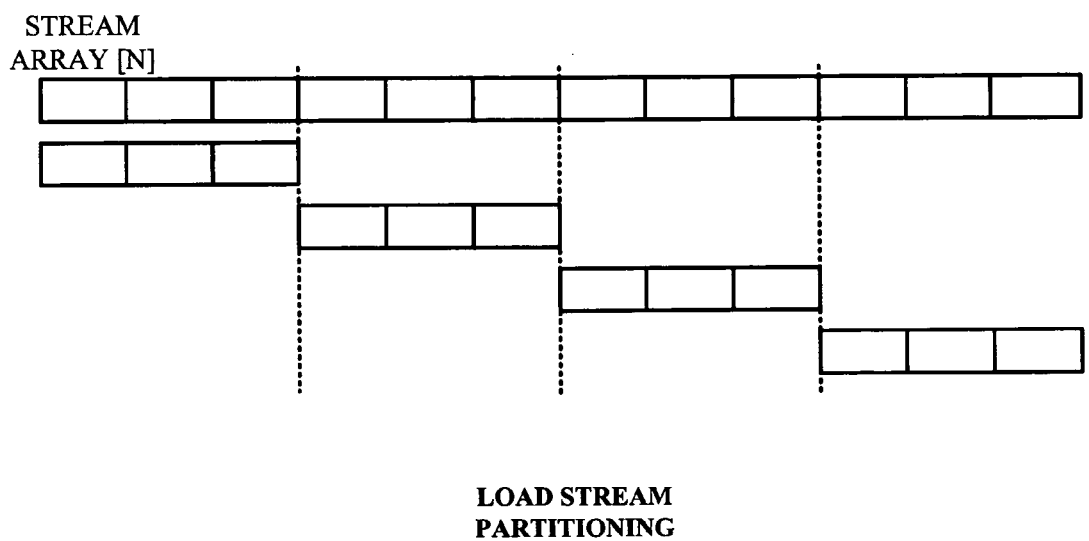

FIG. 4 shows the manner in which data is partitioned for both storing and loading. For storing, the data stream is partitioned according to both the size of a cache line and the number of cache sections 112, 114, 116. FIG. 4 shows three cache sections 112, 114, 116 being used and four iterations of a loop. Each iteration stores a single element from the stream. Thus, for a cache section 112, 114, 116 that can store 16 data elements, 16 iterations of the loop are used to store one cache line. For ease of illustration, in FIG. 4 the data is partitioned such that only four data elements are stored in a cache line. Thus, after four iterations of the modified loop, one cache line in each section 112, 114, 116 contains data from the array, with one element being added to the each of the cache sections 112, 114, 116 during each of the four iterations. For loading, the data stream is partitioned according to the number of streams supported for prefetching by the processor 102. For ease of illustration, in FIG. 4 the array is partitioned into four load streams.

It is apparent to one skilled in the art that numerous modifications and departures from the specific embodiments described herein may be made without departing from the spirit and scope of the invention.

The invention claimed is:

1. A method comprising:
   obtaining a set of instructions forming a loop wherein the instructions manipulate data and wherein the data flows between the instructions;
   producing a data and control flow graph representing the manipulation and flow of the data between the instructions and an execution sequence of the instructions;
   identifying at least one stream wherein each stream comprises a sequence of instructions comprising memory references having a stride less than a cache line size;
   classifying each of the at least one stream wherein the at least one stream comprises one or more load streams and at least one store stream wherein each of the load streams comprises a load instruction none of the at least one store stream comprise a load instruction;
   determining that no data dependencies prevent loop unrolling wherein the data and control flow graph reveal data dependencies;
   determining a static and dynamic profile for the set of instructions;
   selecting a modification factor for the instructions based on a number of separate equivalent sections forming a cache in a processor which is processing the set of instructions;
   unrolling the loop in accordance with the modification factor wherein the static and dynamic profile satisfies a modification criteria to thereby modify the loop for faster execution;
   rearranging the at least one store stream according to the modification factor; and
   writing the instructions to a storage medium after reordering.

2. The method of claim 1 wherein determining the static and dynamic profile comprises:
   determining execution characteristics for the instructions based on computer resources used thereby during execution.

3. The method of claim 2 wherein determining execution characteristics comprises:
   predicting a number of registers in the processor that will be used by the instructions during execution; and
   predicting a number of machine cycles used for execution of the instructions.

4. The method of claim 1 wherein determining the number of streams is based on subscripts in the instructions.

5. The method of claim 1 wherein determining the static and dynamic profile comprises:
   determining a static profile for the instructions; and
   determining a dynamic profile for the instructions based on execution of the instructions with test data.

6. The method of claim 5 wherein determining a static profile comprises:
   determining the number of instructions in the set of instructions; and
   determining a number of iterations of the loop formed by the instructions.

7. The method of claim 5 wherein determining the dynamic profile comprises:
   determining an execution time for the instructions by executing the instructions with the test data.

8. The method of claim 1 wherein determining the static and dynamic profile comprises:
   determining data dependencies in the instructions; and
   identifying iteration dependencies in the data dependencies of the instructions.

9. The method of claim 1 wherein the modification criteria comprises benefit criteria to gauge the benefit of modifying the instructions and feasible criteria to determine if a modification of the instructions can be performed and wherein the step of determining the static and dynamic profile comprises:
   determining execution characteristics for the instructions based on computer resources used thereby during execution;
   determining a static profile for the instructions;
   determining a dynamic profile for the instructions based on execution of the instructions with test data;
   determining data dependencies in the instructions; and
   identifying iteration dependencies in the data dependencies of the instructions;
   the method further comprising:
   determining it the instructions satisfy modification criteria based on the static and dynamic profile comprising:
   comparing the static and dynamic profile to each of the benefit criteria and feasible criteria to determine if the benefit criteria and the feasible criteria are satisfied, comprising:
   comparing the execution characteristics with the benefit criteria;
   comparing the static profile with the benefit criteria;
   comparing the dynamic profile with the benefit criteria;
   comparing the number of streams with the feasible criteria; and
   comparing the iteration dependencies with the feasible criteria.

10. The method of claim 1 wherein the modification criteria comprises benefit criteria to gauge the benefit of modifying the instructions and feasible criteria to determine if a modification of the instructions can be performed;
    the method further comprising:
    determining if the instructions satisfy modification criteria based on the static and dynamic profile comprising:
    comparing the static and dynamic profile to each of the benefit criteria and feasible criteria to determine if the benefit criteria and the feasible criteria are satisfied.

11. The method of claim 1 wherein selecting a modification factor comprises:
    setting the modification factor to the number of separate sections in the cache.

12. The method of claim 1 wherein unrolling the loop comprises:

arranging the instructions so that the loop formed by the instructions is unrolled according to the modification factor;

modifying a number of iterations of the loop according to the unrolling based on the modification factors.

13. A system comprising:

a computer-readable storage medium a set build mechanism that obtains a set of instructions forming a loop;

a flow graph build mechanism that produces a flow and control graph of the loop;

a data identification mechanism that identifies data used by and manipulated by the set of instructions;

a profile determination mechanism that determines a static and dynamic profile for the instructions;

a comparison mechanism that determines if the instructions satisfy modification criteria based on the static and dynamic profile;

a stream determination mechanism that finds streams within the within the data used by and manipulated by the set of instructions wherein every stream comprises a sequence of instructions comprising memory references having a stride less than a cache line size;

a stream classification mechanism that classifies each one of the streams as belonging to one of a set of stream classes comprising load streams and store streams wherein a load-stream comprises at least one load instruction none of the store stream comprises a load instruction;

a factor determination mechanism that determines a modification factor for the loop;

a modification implementation mechanism that modifies the instructions according to the modification factor, a modification criteria, and the static and dynamic profile; and a stream partitioning mechanism that modifies the load streams according to a number of prefetch streams in the processor wherein the instructions are stored after being modified.

14. The system of claim 13 further comprising:

an execution characteristics determination mechanism that determines execution characteristics for the instructions based on computer resources used thereby during execution.

15. The system of claim 13 wherein the profile determination mechanism comprises:

a static profile determination mechanism that determines a static profile for the instructions; and a dynamic profile determination mechanism that determines a dynamic profile for the instructions based on execution of the instructions with test data.

16. The system of claim 13 further comprising:

a dependency analysis mechanism that determines data dependencies in the set of instructions and identifies iteration dependencies in the data dependencies.

17. The system of claim 13 wherein the comparison mechanism compares the static and dynamic profile to each of a plurality of benefit criteria and a plurality of feasible criteria to determine if the benefit criteria and the feasible criteria are satisfied.

18. The system of claim 13 wherein the modification implementation mechanism comprises:

an unroll implantation mechanism that unrolls the loop according to the modification factor and modifies;

the number of iterations of the loop according to the modification factor; and an interleave implementation mechanism that rearranges the store streams according to the modification factor.

19. A method comprising:

accepting a set of instructions forming a loop wherein the instructions manipulate data and wherein the data flows between the instructions;

producing a data and control flow graph representing the manipulation and flow of the data between the instructions and an execution sequence of the instructions;

identifying at least one stream wherein each stream comprises a sequence of instructions comprising memory references having a stride less than a cache line size classifying each of the at least one stream wherein the at least one stream comprises at least one load stream and one or more store streams wherein each of the at least one load stream comprises a load instruction none of the zero or more store streams comprise a load instruction;

selecting a load modification factor for the instructions based on a number of prefetch streams in the processor;

modifying the at least one load stream according to the load modification factor when the instructions satisfy modification criteria to thereby modify the loop for faster execution; and writing the instructions to a storage medium after modification.

20. The method of claim 19 further comprising:

determining a static and dynamic profile for the loop;

determining if the instructions satisfy modification criteria based on the static and dynamic profile for the instructions;

selecting a store modification factor for the instructions based on a number of separate equivalent sections forming a cache; and rearranging the at least the store stream according to the store modification factor and the static and dynamic profile when the instructions satisfy the modification criteria.

21. The method of claim 20 wherein the modification criteria comprises benefit criteria to gauge the benefit of modifying the Instructions and feasible criteria to determine if a modification of the instructions can be performed and wherein the step for determining the static and dynamic profile comprises:

determining execution characteristics for the instructions based on computer resources used thereby during execution;

determining a static profile for the instructions;

determining a dynamic profile for the instructions based on execution of the instructions with test data;

determining data dependencies in the instructions; and identifying iteration dependencies in the data dependencies of the instructions;

the method further comprising:

determining if the instructions satisfy modification criteria based on the static and dynamic profile comprising:

comparing the static and dynamic profile to each of the benefit criteria and feasible criteria to determine if the benefit criteria and the feasible criteria are satisfied, comprising:

comparing the execution characteristics with the benefit criteria;

comparing the static profile with the benefit criteria;

comparing the dynamic profile with the benefit criteria;

comparing the number of unique streams with the feasible criteria; and comparing the iteration dependencies with the feasible criteria.

22. The method of claim 20 wherein the modification criteria comprises benefit criteria to gauge the benefit of modifying the instructions and feasible criteria to determine if a modification of the instructions can be performed;

the method further comprising:

determining if the instructions satisfy modification criteria based on the static and dynamic profile comprising:

comparing the static and dynamic profile to each of the benefit criteria and feasible criteria to determine if the benefit criteria and the feasible criteria are satisfied.

23. The method of claim 20 wherein the step for selecting a store modification factor comprises:

setting the store modification factor to the number of separate sections in the cache.

24. The method of claim 20 wherein the step for rearranging the at least one store stream comprises:

arranging the instructions so that the loop is unrolled according to the store modification factor;

modifying a number of iterations of the loop according to the store modification factor; and replicating and modifying the instructions according to the store modification factor.

25. The method of claim 20 wherein the step of selecting a load modification factor comprises:

setting the load modification factor to the number of streams prefetched by the processor.

26. The method of claim 20 wherein the step of modifying the at least one load stream comprises:

partitioning data to be loaded into multiple streams according to the load modification factor.

27. The method of claim 19 wherein the modification criteria comprises benefit criteria to gauge the benefit of modifying the instructions and feasible criteria to determine if a modification of the instructions can be performed and wherein a step for determining the static and dynamic characteristics comprises:

determining execution characteristics for the instructions based on computer resources used thereby during execution;

determining a static profile for the instructions;

determining a dynamic profile for the instructions based on execution of the instructions with test data;

determining a number of unique streams in the instructions;

determining data dependencies in the instructions; and identifying iteration dependencies in the data dependencies of the instructions;

the method further comprising:

determining if the instructions satisfy modification criteria based on the static and dynamic characteristics comprising:

comparing the static and dynamic profile to each of the benefit criteria and feasible criteria to determine if the benefit criteria and the feasible criteria are satisfied, comprising:

comparing the execution characteristics with the benefit criteria;

comparing the static profile with the benefit criteria;

comparing the dynamic profile with the benefit criteria;

comparing the number of unique streams with the feasible criteria; and comparing the iteration dependencies with the feasible criteria.

28. The method of claim 19 wherein the modification criteria comprises benefit criteria to gauge the benefit of modifying the instructions arid feasible criteria to determine if a modification of the instructions can be performed;

the method further comprising:

determining if the instructions satisfy modification criteria based on the static and dynamic profile comprising:

comparing the static and dynamic profile to each of the benefit criteria and feasible criteria to determine if the benefit criteria and the feasible criteria are satisfied.

29. The method of claim 19 wherein the step of selecting a load modification factor comprises:

setting the load modification factor to the number of streams prefetched by the processor.

30. The method of claim 19 wherein the step of modifying the at least one load stream comprises:

partitioning data to be loaded into multiple streams according to the load modification factor.

* * * * *